(12) United States Patent
Chen et al.

(10) Patent No.: US 11,366,688 B2
(45) Date of Patent: Jun. 21, 2022

(54) DO-NOT-DISTURB PROCESSING METHOD AND APPARATUS, AND STORAGE MEDIUM

(71) Applicant: Baidu Online Network Technology (Beijing) Co., Ltd., Beijing (CN)

(72) Inventors: Chaoyang Chen, Beijing (CN); Mengmeng Zhang, Beijing (CN); Wenming Wang, Beijing (CN); Chen Chen, Beijing (CN); Guangyao Tang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 105 days.

(21) Appl. No.: 16/680,773

(22) Filed: Nov. 12, 2019

(65) Prior Publication Data

US 2020/0409745 A1 Dec. 31, 2020

(30) Foreign Application Priority Data

Jun. 28, 2019 (CN) .......................... 201910578797.6

(51) Int. Cl.
*G06F 9/48* (2006.01)
*G06F 16/2458* (2019.01)
*G06F 16/22* (2019.01)

(52) U.S. Cl.
CPC .......... *G06F 9/485* (2013.01); *G06F 16/2228* (2019.01); *G06F 16/2458* (2019.01)

(58) Field of Classification Search
CPC ............. H04M 1/663; H04M 1/72451; H04M 1/72454; H04M 1/72457; H04M 1/72463; H04M 1/72469; H04M 2203/6054; H04M 2250/12; G06F 16/2228; G06F 16/2458; G06F 9/485; G06F 9/4881; G06F 9/546
See application file for complete search history.

(56) References Cited

U.S. PATENT DOCUMENTS 9,348,607 B2 * 5/2016 Chaudhri ................ G06F 3/167
10,610,152 B2 * 4/2020 Zou ...................... A61B 5/6802
(Continued)

FOREIGN PATENT DOCUMENTS

| CN | 105096102 | 11/2015 |
|---|---|---|
| CN | 107395875 | 11/2017 |

(Continued)

OTHER PUBLICATIONS

JP 2019-210466 Notice of Reasons for Refusal, 10 pages (dated Dec. 18, 2020).
Decision of Refusal JP 2019-210466 (dated May 21, 2021) (6 pages).
Chinese Search Report CN 201910578797.6 (dated Nov. 25, 2021) (5 pages).

(Continued)

*Primary Examiner* — Jorge A Chu Joy-Davila
(74) *Attorney, Agent, or Firm* — AuerbachSchrot LLC; William C. Schrot; Jeffrey I. Auerbach

(57) ABSTRACT

A do-not-disturb processing method, apparatus and a storage medium are provided. The method includes: receiving a first request message for a sleeping request; generating a query instruction according to first time information carried in the first request message; determining a restricted time period based on the first time information, in response to the query instruction; acquiring at least one first task within the restricted time period, from multiple interaction tasks to be executed; and closing the first task. In embodiments of the present application, efficiency of an interaction process is improved.

11 Claims, 6 Drawing Sheets

(56) References Cited

U.S. PATENT DOCUMENTS

| | | | | |
|---|---|---|---|---|
| 2005/0249023 | A1* | 11/2005 | Bodlaender | H04M 3/53333 365/232 |
| 2010/0085842 | A1* | 4/2010 | Lazaridis | G04G 13/026 368/73 |
| 2015/0109104 | A1* | 4/2015 | Fadell | H04L 67/12 340/5.65 |
| 2015/0296276 | A1 | 10/2015 | Umetani et al. | |
| 2015/0317892 | A1* | 11/2015 | Raj | G06Q 10/103 340/6.1 |
| 2016/0062590 | A1* | 3/2016 | Karunamuni | H04M 19/045 715/863 |
| 2017/0068480 | A1* | 3/2017 | Huang | G06F 3/0625 |
| 2018/0217865 | A1* | 8/2018 | Caliendo, Jr. | G06F 9/4843 |
| 2018/0344240 | A1* | 12/2018 | Pituch | A61B 5/4809 |
| 2019/0334907 | A1* | 10/2019 | Rodden | G06Q 10/063116 |
| 2020/0076939 | A1* | 3/2020 | Lambourne | H04W 4/20 |
| 2020/0128653 | A1* | 4/2020 | Magielse | H05B 47/16 |

FOREIGN PATENT DOCUMENTS

| | | |
|---|---|---|
| CN | 108089905 | 5/2018 |
| CN | 108133363 | 6/2018 |
| CN | 109545222 | 3/2019 |
| JP | 2002-315069 | 10/2002 |
| JP | 2017-009867 | 1/2017 |
| JP | 2017-069687 | 4/2017 |
| JP | 2017208112 A | 11/2017 |
| WO | WO 2016/052172 | 4/2016 |

OTHER PUBLICATIONS

Decision to Grant a Patent JP 2019-210466 (dated Nov. 9, 2021) (5 pages).

First Office Action CN 201910578797.6 (dated Dec. 1, 2021) (9 pages).

* cited by examiner

DO-NOT-DISTURB PROCESSING METHOD AND APPARATUS, AND STORAGE MEDIUM

CROSS-REFERENCE TO RELATED APPLICATION

This application claims priority to Chinese Patent Application No. 201910578797.6, filed on Jun. 28, 2019, which is hereby incorporated by reference in its entirety.

TECHNICAL FIELD

The present application relates to a field of information processing technology, and in particular, to a do-not-disturb (DND) processing method, apparatus, and a storage medium.

BACKGROUND

An application scenario of information processing is to perform information interaction between a user and a smart device (or a smart terminal). The smart terminal may be a mobile phone, a tablet, a wearable device, a smart speaker, and the like. For example, in a night scenario, a user initiates a sleep request to a smart device. If the smart terminal ignores the sleep request and still starts a preset timed task as scheduled, it will cause a disturbance to the user, and the disturbance is an invalid interaction (this is because the user's sleep request is not effectively responded to through interaction), thereby reducing the efficiency of an interaction process. However, this issue has not been effectively addressed.

SUMMARY

A DND processing method is provided according to an embodiment of the present application, so as to solve one or more technical problems in the existing technology.

In a first aspect, a DND processing method is provided according to an embodiment of the present application. The method includes:

receiving a first request message for a sleeping request;

generating a query instruction according to first time information carried in the first request message;

determining a restricted time period based on the first time information, in response to the query instruction;

acquiring at least one first task within the restricted time period, from multiple interaction tasks to be executed; and closing the first task.

In an implementation, before the receiving the first request message for the sleeping request, the method further includes:

configuring the multiple interaction tasks to be executed, according to historical data of a target user, wherein the multiple interaction tasks to be executed include a routine task and/or a scheduled task of the target user.

In an implementation, the determining the restricted time period based on the first time information, in response to the query instruction, includes:

querying the first time information from night time period information, by using the first time information as a query index;

setting the queried first time information as an initial time identifier of the restricted time period;

setting end time information of the night time period information as an end time identifier of the restricted time period; and determining the restricted time period according to the initial time identifier and the end time identifier.

In an implementation, after the closing the first task, the method further includes:

monitoring system time of a terminal;

acquiring a second task related to second time information from the multiple interaction tasks to be executed, in a case where the system time reaches to a time corresponding to the second time information and the time corresponding to the second time information is not within the restricted time period; and executing the second task.

In an implementation, after the closing the first task, the method further includes:

obtaining a message encapsulation format and at least two elements constituting a message content, wherein the at least two elements including a time field and a reminder field for indicating that the first task has been closed;

generating a first response message according to the message encapsulation format and the message content; and sending the first response message.

In an implementation, after the closing the first task, the method further includes:

collecting times of N historical records for initiating the first request message within a preset time period, wherein N is a positive integer greater than 1;

acquiring third time information related to a sleep intention according to the collected times, wherein the third time information includes time point information or time period information; and updating the restricted time period according to third time point information.

In an implementation, the method further includes:

generating a second request message for asking whether to enter a sleeping related mode, according to the third time point information, and sending the second request message;

receiving a second response message, wherein an affirmative answer to enter the sleeping related mode is encapsulated into the second response message; and closing a third task in the multiple interaction tasks to be executed according to the updated restricted time period.

In a second aspect, a DND processing apparatus is provided according to an embodiment of the present application. The apparatus includes:

a first acquiring unit, configured to receive a first request message for a sleeping request;

an instruction generating unit, configured to generate a query instruction according to first time information carried in the first request message;

a response unit, configured to determine a restricted time period based on the first time information, in response to the query instruction;

a first task acquiring unit, configured to acquire at least one first task within the restricted time period, from multiple interaction tasks to be executed; and a first task closing unit, configured to close the first task.

In an implementation, the apparatus further includes a configuration unit for configuring the multiple interaction tasks to be executed, according to historical data of a target user, wherein the multiple interaction tasks to be executed include a routine task and/or a scheduled task of the target user.

In an implementation, the response unit is further configured to:

query the first time information from night time period information, by using the first time information as a query index;

set the queried first time information as an initial time identifier of the restricted time period;

set end time information of the night time period information as an end time identifier of the restricted time period; and determine the restricted time period according to the initial time identifier and the end time identifier.

In an implementation, the apparatus further includes:

a monitoring unit, configured to monitor system time of a terminal;

a second task acquiring unit, configured to acquire a second task related to second time information from the multiple interaction tasks to be executed, in a case where the system time reaches to a time corresponding to the second time information and the time corresponding to the second time information is not within the restricted time period;

a task execution unit, configured to execute the second task.

In an implementation, the apparatus further includes:

an encapsulation unit, configured to obtain a message encapsulation format and at least two elements constituting a message content, wherein the at least two elements including a time field and a reminder field for indicating that the first task has been closed;

a message generation unit, configured to generate a first response message according to the message encapsulation format and the message content; and a first message sending unit, configured to send the first response message.

In an implementation, the apparatus further includes:

a collection unit, configured to collect times of N historical records for initiating the first request message within a preset time period, wherein N is a positive integer greater than 1;

a sleeping intention acquiring unit, configured to acquire third time information related to a sleep intention according to the collected times, wherein the third time information includes time point information or time period information; and an updating unit, configured to update the restricted time period according to third time point information.

In an implementation, the apparatus further includes:

a second message sending unit, configured to generate a second request message for asking whether to enter a sleeping related mode, according to the third time point information, and send the second request message;

a second message receiving unit, configured to receive a second response message, wherein an affirmative answer to enter the sleeping related mode is encapsulated into the second response message; and a second task closing unit, configured to close a third task in the multiple interaction tasks to be executed according to the updated restricted time period.

In a third aspect, a DND processing apparatus is provided according to an embodiment of the present application. The functions of the device may be implemented by using hardware or by corresponding software executed by hardware. The hardware or software includes one or more modules corresponding to the functions described above.

In a possible embodiment, the apparatus structurally includes a processor and a memory, wherein the memory is configured to store a program which supports the apparatus in executing the above DND processing method. The processor is configured to execute the program stored in the memory. The apparatus may further include a communication interface through which the apparatus communicates with other devices or communication networks.

In a fourth aspect, a computer-readable storage medium for storing computer software instructions used for a DND processing apparatus is provided. The computer readable storage medium may include programs involved in executing of the DND processing method described above.

One of the above technical solutions has the following advantages or beneficial effects: in embodiments of the present application, a first request message for a sleeping request may be received by a smart terminal (or a cloud platform), a query instruction may be generated according to first time information carried in the first request message, a restricted time period may be determined based on the first time information, in response to the query instruction, at least one first task within the restricted time period is then acquired from multiple interaction tasks to be executed, and then the first task is closed. According to embodiments of the present application, after receiving a first request message for a sleeping request (such as a sleeping request) issued by a user, a target task within a restricted time period (such as at least one first task within a restricted time period) may be correspondingly closed. Since a target task preset by a user may be closed, the issue of causing a disturbance to a user may be avoided, and the user's sleeping request may be effectively responded to through interactions (which are effective interactions), thereby improving the efficiency of an interaction process With an embodiment of the present invention, after a user activates a first request message (such as a sleep request) related to a sleep request, the target task (such as at least one first task in the restricted time period) can be closed. Since the target task set by the user before can be closed, thus, the problem of causing disturbance to the user is avoided, and when the user's sleep request is effectively implemented through interaction, it is an effective interaction, thereby improving the effectiveness of interaction processing.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

In the existing technology, it is found that a user may initiate a sleep request, such as "I am going to sleep", to a smart device (or a smart terminal) in a night scenario. If a timed task preset by the user is still executed as scheduled after the sleep request is initiated, it will obviously cause a disturbance to the user and may cause the user to feel anxious. Further, the disturbance is an invalid interaction (this is because the user's sleep request is not responded to through interaction and then may not be effectively implemented accordingly), thereby reducing the efficiency of an interaction process. The above smart device may be a mobile phone, a tablet, a wearable device, a smart speaker, etc. Taking a smart speaker as an example, if the user feels disturbed and therefore anxious, the user may directly initiate a deletion request to the smart speaker. In the above night scenario, it is needed to perform an optimization process on the information interaction between the user and the smart device (or the smart terminal), specifically to perform a DND process for the information interaction.

Figure 1:
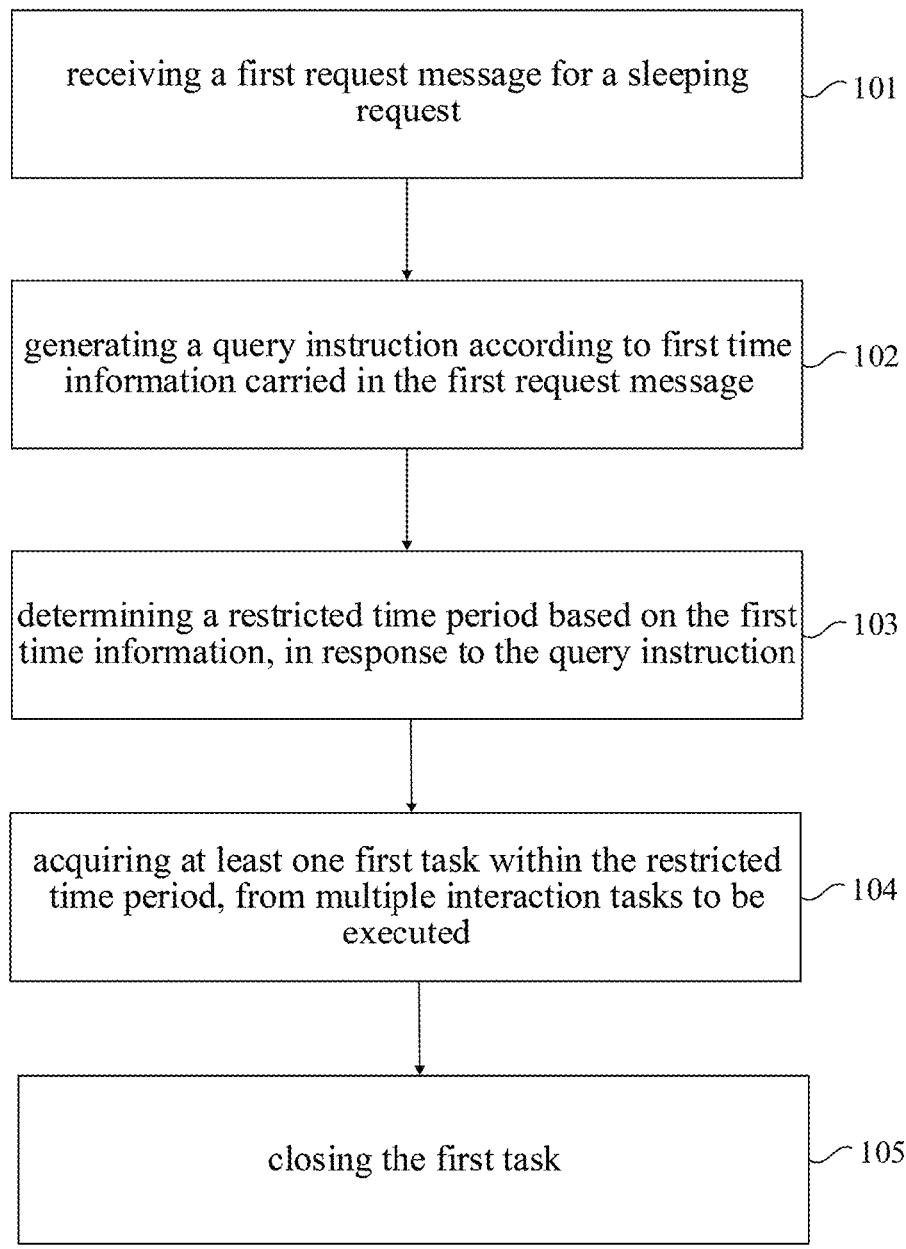
FIG. 1 is a flowchart showing a DND processing method according to an embodiment of the present application.

FIG. 1 is a flowchart showing a DND processing method according to an embodiment of the present application. As shown in FIG. 1, the method includes following steps.

In S101, a first request message for a sleeping request is received.

In an example, taking a smart speaker as an example, after a user expresses, for example, "good night", the smart speaker receives a first request message (such as a sleeping request "good night"), and performs processes in the following S101 to S105, so that a routine task at the night set by the user may not be executed, thereby avoiding waking up the user. The processes in S101 to S105 may be performed on a smart device (or a smart terminal) side, such as a smart speaker, or may be performed on a cloud platform side, such as a cloud platform composed of server clusters. If limitations of the processing power and resources of a smart speaker is not taken into account too much, the advantage of performing the above processes on a smart speaker side is then: the processing efficiency may be improved, since there is no need to feed back a request to a cloud platform to perform a process, and there is no need to wait for any feedback result of the cloud platform to close a task. While, the advantage of performing the above processes on a smart speaker side is: the smart speaker merely needs to receive a sleep request, forward the sleep request to a cloud platform, receive a feedback result sent by the cloud platform, and perform a task closing operation, in this way, the energy consumption of the smart speaker may be reduced, and power may be saved.

In an example, the first request message is not necessarily limited to the sleep request "good night". For example, a user may not express a sleep request accurately in detail, that is, a user may not explicitly speak the expression of "I want to sleep" out, other expressions related to a sleeping request, such as "goodbye, smart speaker", "see you tomorrow, smart speaker", "I am sleepy, smart speaker" or "shut down" spoken out by a user, all of which fall within the protection scope of embodiments of the present application.

In S102, a query instruction is generated according to first time information carried in the first request message.

In an example, taking a smart speaker as an example, the smart speaker receives a sleeping request "good night" issued by a user, and first time information is carried in the sleep request, for example, the sleep request is initiated at 20:30. Based on the first time information, it may be determined that a timed task after 20:30 is required to be closed. Therefore, a corresponding query instruction is generated, to obtain a corresponding timed task.

In S103, a restricted time period is determined based on the first time information, in response to the query instruction.

In an example, taking a smart speaker as an example, the smart speaker may respond to a query instruction. According to first time information and a query requirement carried in the query instruction, for example, a sleeping request is initiated at 20:30, based on the first time information, it may be determined that a timed task after 20:30 is required to be closed. A restricted time period corresponding to the time is acquired, to obtain a corresponding timed task.

In S104, at least one first task within the restricted time period is acquired from multiple interaction tasks to be executed.

In an example, multiple interaction tasks to be executed may be tasks preset by a user before a first request message for a sleeping request is received. The multiple interaction tasks to be executed may be set according to historical data of a target user. The multiple interaction tasks to be executed include a routine task and/or a scheduled task of a target user, such as a scheduled task of a child. Taking a smart speaker as an example, according to first time information and a query requirement carried in the query instruction, for example, a sleeping request is initiated at 20:30, based on the first time information, it may be determined that a timed task after 20:30 is required to be closed. A restricted time period corresponding to the time is acquired, and at least one first task within the restricted time period is closed, such as a task of listening to English or reading a book at 21:00.

In S105, the first task is closed.

In embodiments of the present application, after receiving a first request message for a sleeping request (such as a sleeping request) issued by a user, a target task within a restricted time period (such as at least one first task within a restricted time period) may be correspondingly closed. Since a target task preset by a user may be closed, the issue of causing a disturbance to a user may be avoided, and the user's sleeping request may be effectively responded to through interactions, (which are effective interactions), thereby improving the efficiency of an interaction process.

Figure 2:
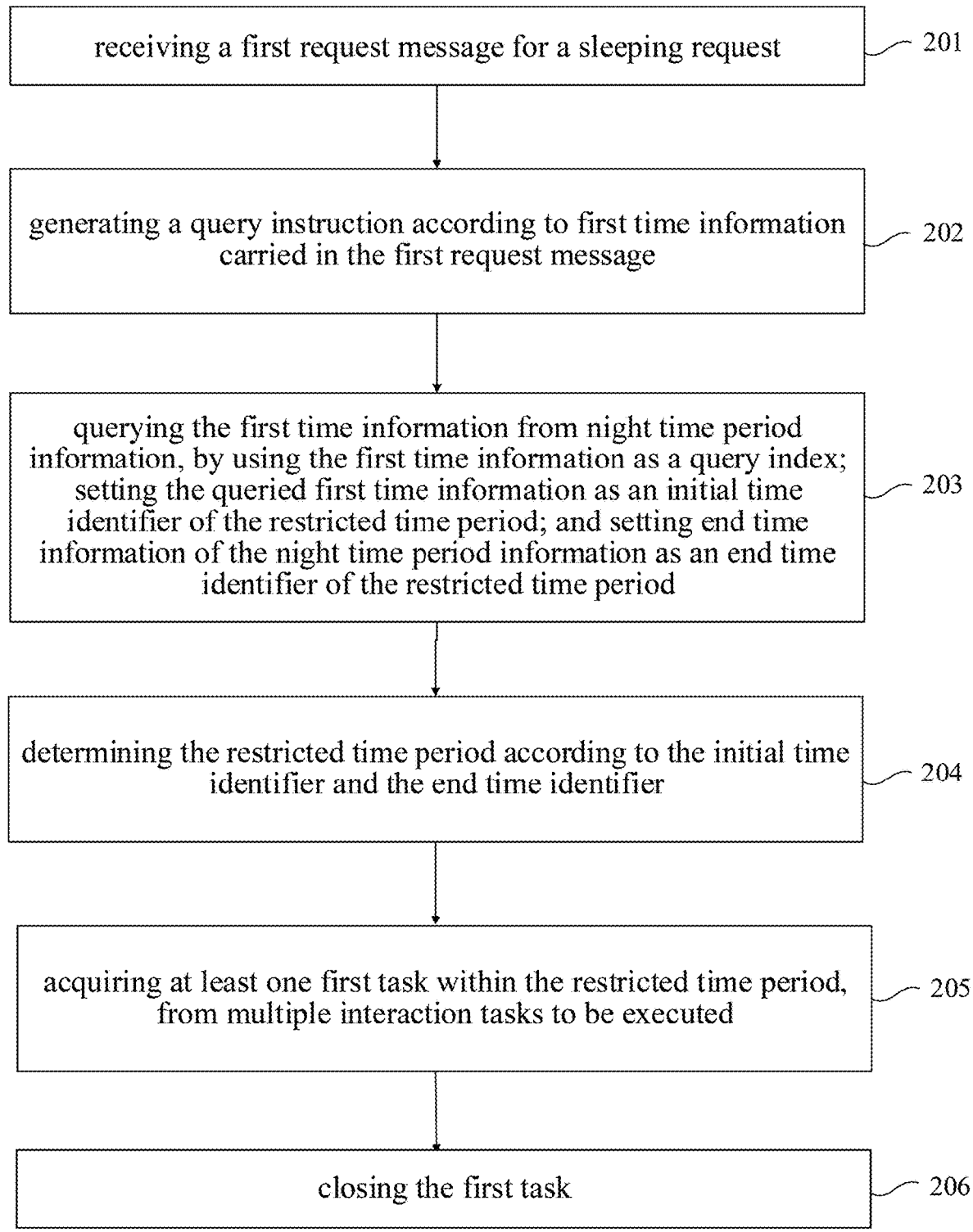
FIG. 2 is a flowchart showing a DND processing method according to an embodiment of the present application.

FIG. 2 is a flowchart showing a DND processing method according to an embodiment of the present application. As shown in FIG. 2, the method includes following steps.

In S201, a first request message for a sleeping request is received.

In an example, taking a smart speaker as an example, after a user expresses, for example, "good night", the smart speaker receives a first request message (such as a sleeping request "good night"), and performs processes in the following S201 to S206, so that a routine task at the night set by the user may not be executed, thereby avoiding waking up the user. The processes in S201 to S206 may be performed on a smart device (or a smart terminal) side, such as a smart speaker, or may be performed on a cloud platform side, such as a cloud platform composed of server clusters. If limitations of the processing power and resources of a smart speaker is not taken into account too much, the advantage of performing the above processes on a smart speaker side is that: the processing efficiency may be improved, since there is no need to feed back a request to a cloud platform to perform a process, and there is no need to wait for any feedback result of the cloud platform to close a task. The advantage of performing the above processes on a smart speaker side is that the smart speaker merely needs to receive a sleep request, forward the sleep request to a cloud platform, receive a feedback result sent by the cloud platform, and perform a task closing operation. In this way, the energy consumption of the smart speaker may be reduced, and power may be saved.

In an example, the first request message is not necessarily limited to the sleep request "good night". For example, because a user may not express a sleep request accurately in detail, that is, a user may not explicitly speak the expression of "I want to sleep" out, other expressions related to a sleeping request, such as "goodbye, smart speaker", "see you tomorrow, smart speaker", "I am sleepy, smart speaker" or "shut down" spoken out by a user, all fall within the protection scope of embodiments of the present application.

In S202, a query instruction is generated according to first time information carried in the first request message.

In an example, taking a smart speaker as an example, the smart speaker receives a sleeping request "good night" issued by a user, and first time information is carried in the sleep request, for example, the sleep request is initiated at 20:30. Based on the first time information, it may be determined that a timed task after 20:30 is required to be closed. Therefore, a corresponding query instruction is generated, to obtain a corresponding timed task.

In S203, the first time information is queried from night time period information, by using the first time information as a query index, the queried first time information is set as an initial time identifier of the restricted time period, and end time information of the night time period information is set as an end time identifier of the restricted time period.

In S204, the restricted time period is determined according to the initial time identifier and the end time identifier.

In an example, taking a smart speaker as an example, the smart speaker may respond to a query instruction. According to first time information and a query requirement carried in the query instruction, for example, a sleeping request is initiated at 20:30, based on the first time information, an initial time identifier and an end time identifier included in the night time period information may be queried. Then, the restricted time period relating to the first time information may be determined according to the initial time identifier and the end time identifier. For example, it may be determined that a timed task after 20:30 is required to be closed, the smart speaker may query the restricted time period relating to the time. If a timed task during a time period from 20:30 to 21:00 is queried, or if a timed task during a time period from 21:00 to 22:00 is queried, the smart speaker may acquire the queried timed tasks.

In S205, at least one first task within the restricted time period is acquired from multiple interaction tasks to be executed.

In an example, multiple interaction tasks to be executed may be tasks preset by a user before a first request message for a sleeping request is received. The multiple interaction tasks to be executed may be set according to historical data of a target user. The multiple interaction tasks to be executed include a routine task and/or a scheduled task of a target user, such as a scheduled task of child. Taking a smart speaker as an example, according to first time information and a query requirement carried in the query instruction, for example, a sleeping request is initiated at 20:30, based on the first time information, it may be determined that a timed task after 20:30 is required to be closed. A restricted time period corresponding to the time is acquired, and at least one first task within the restricted time period is closed, such as a task of listening to English or reading a book at 21:00.

In S206, the first task is closed.

In embodiments of the present application, after receiving a first request message for a sleeping request (such as a sleeping request) issued by a user, a target task within a restricted time period (such as at least one first task within a restricted time period) may be correspondingly closed. Since a target task preset by a user may be closed, the issue of causing a disturbance to the user is avoided, and the user's sleeping request is effectively responded to through interaction, which is an effective interaction, thereby improving the efficiency of an interaction process.

Figure 3:
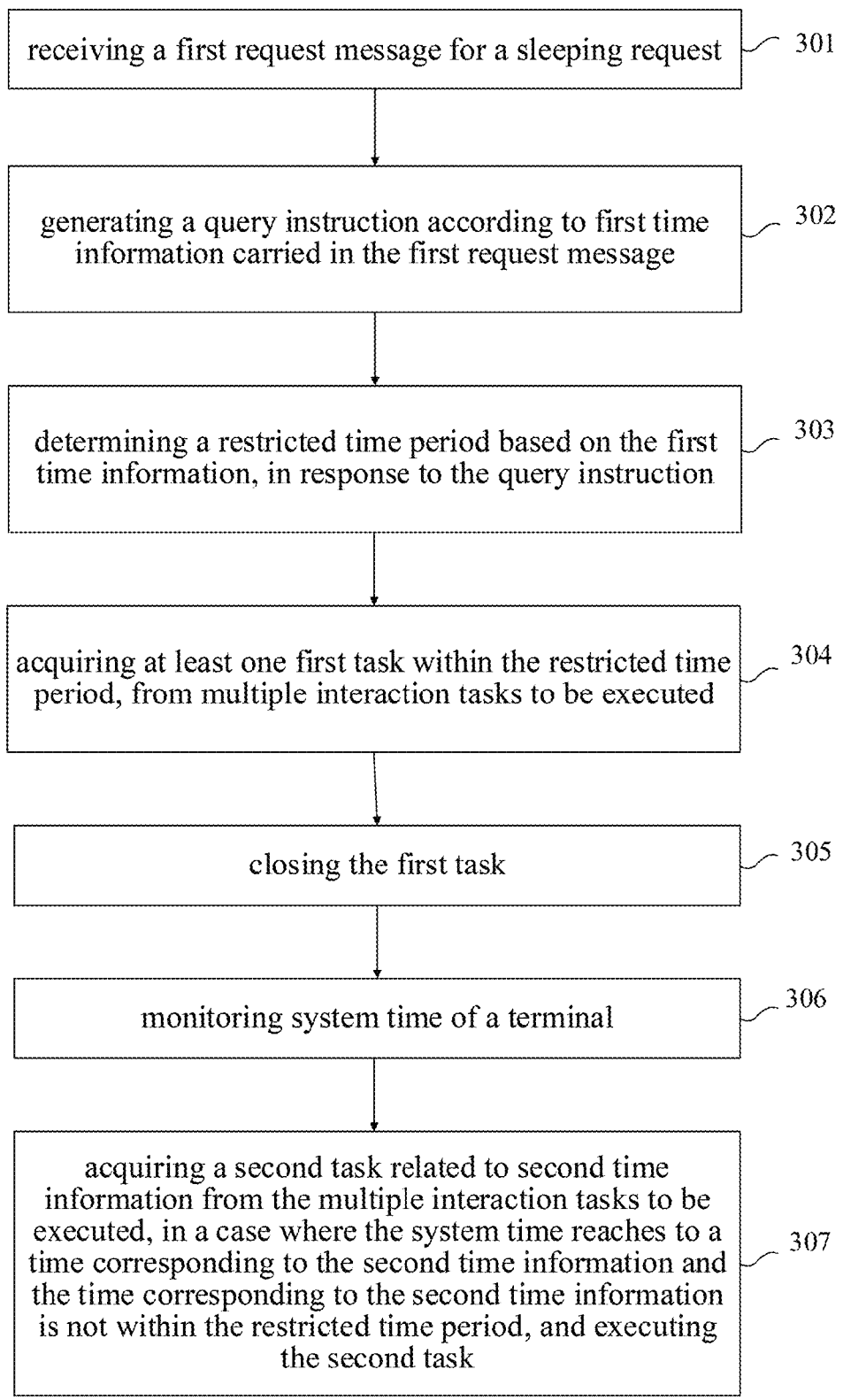
FIG. 3 is a flowchart showing a DND processing method according to an embodiment of the present application.

FIG. 3 is a flowchart showing a DND processing method according to an embodiment of the present application. As shown in FIG. 3, the method includes following steps.

In S301, a first request message for a sleeping request is received.

In an example, taking a smart speaker as an example, after a user expresses, for example, "good night", the smart speaker receives a first request message (such as a sleeping request "good night"), and performs processes in the following S301 to S307, so that a routine task at the night set by the user may not be executed, thereby avoiding waking up the user. The processes in S301 to S307 may be performed on a smart device (or a smart terminal) side, such as a smart speaker, or may be performed on a cloud platform side, such as a cloud platform composed of server clusters. If limitations of the processing power and resources of a smart speaker is not taken into account too much, the advantage of performing the above processes on a smart speaker side is then: the processing efficiency may be improved, since there is no need to feed back a request to a cloud platform to perform a process, and there is no need to wait for any feedback result of the cloud platform to close a task. While, the advantage of performing the above processes on a smart speaker side is: the smart speaker merely needs to receive a sleep request, forward the sleep request to a cloud platform, receive a feedback result sent by the cloud platform, and perform a task closing operation, in this way, the energy consumption of the smart speaker may be reduced, and power may be saved.

In an example, the first request message is not necessarily limited to the sleep request "good night". For example, because a user may not express a sleep request accurately in detail, that is, a user may not explicitly speak the expression of "I want to sleep" out, other expressions related to a sleeping request, such as "goodbye, smart speaker", "see you tomorrow, smart speaker", "I am sleepy, smart speaker" or "shut down" spoken out by a user, all fall within the protection scope of embodiments of the present application.

In S302, a query instruction is generated according to first time information carried in the first request message.

In an example, taking a smart speaker as an example, the smart speaker receives a sleeping request "good night" issued by a user, and first time information is carried in the sleep request, for example, the sleep request is initiated at 20:30. Based on the first time information, it may be determined that a timed task after 20:30 is required to be closed. Therefore, a corresponding query instruction is generated, to obtain a corresponding timed task.

In S303, a restricted time period is determined based on the first time information, in response to the query instruction.

In an example, taking a smart speaker as an example, the smart speaker may respond to a query instruction. According to first time information and a query requirement carried in the query instruction, for example, a sleeping request is initiated at 20:30, based on the first time information, it may be determined that a timed task after 20:30 is required to be closed. A restricted time period corresponding to the time is acquired, to obtain a corresponding timed task.

In S304, at least one first task within the restricted time period is acquired from multiple interaction tasks to be executed.

In an example, multiple interaction tasks to be executed may be tasks preset by a user before a first request message for a sleeping request is received. The multiple interaction tasks to be executed may be set according to historical data of a target user. The multiple interaction tasks to be executed include a routine task and/or a scheduled task of a target user (such as a scheduled task of child). Taking a smart speaker as an example, according to first time information and a query requirement carried in the query instruction, for example, a sleeping request is initiated at 20:30, based on the first time information, it may be determined that a timed task after 20:30 is required to be closed. A restricted time period corresponding to the time is acquired, and at least one first task within the restricted time period is closed, such as a task of listening to English or reading a book at 21:00.

In S305, the first task is closed.

In S306, system time of a terminal is monitored.

In S307, a second task related to second time information is acquired from the multiple interaction tasks to be executed, in a case where the system time reaches to a time corresponding to the second time information and the time corresponding to the second time information is not within the restricted time period; and the second task is executed.

In embodiments of present application, for the second time information, for example, in an unrestricted time period (e.g., a time period in a non-sleeping scene, such as at about 5:30 in the morning), a user should wake up through a preset morning wake-up service (such as a morning call service). In this case, a wake-up task should be initiated. And at the time corresponding to the wake-up service (that is, at 5:30 in the morning), all tasks of a new day should be initiated for execution.

Figure 4:
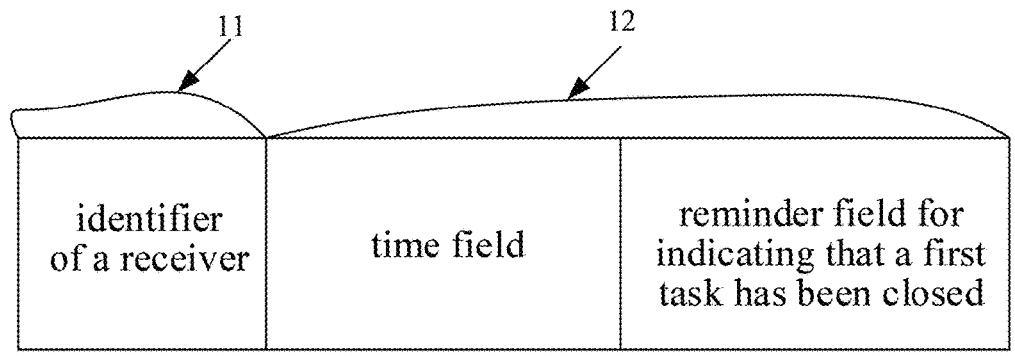
FIG. 4 is a schematic diagram showing a message encapsulation according to an embodiment of the present application.

FIG. 4 is a schematic diagram showing a message encapsulation according to an embodiment of the present application. After the closing the first task, the method further includes: obtaining a message encapsulation format and at least two elements constituting a message content, for example, a message header 11 and a message body 12 shown in FIG. 4. The message header 11 may include an identifier of a receiver (or a target user), that is, the message header indicates to which receiver (or to which target user) the encapsulated first response message is sent. The message body 12 may include at least two elements, the at least two elements include a time field and a reminder field for indicating that the first task has been closed. Then, a first response message is generated according to the message encapsulation format and the message content, and the first response message is sent.

In an example, an interaction specifically refers to a return of a user's feedback. For example, if a sleeping intention in a restricted time period is found, it is queried whether a routine task and/or a scheduled task exists within the restricted time period. In a case where a routine task and/or a scheduled task is queried, it is not executed on that day. That is to say, if there is currently a routine/scheduled target that needs to be closed, a voice message, for example, <(the routine task/the scheduled task/the routine task and the scheduled task) are all closed for you> is sent. For example, when a user issues a sleeping request "I am going to sleep", the smart speaker may feedback "Good night, <(the routine task/the scheduled task/the routine task and the scheduled task) are all closed for you>, let's put these <music/bedtime story/ . . . > with you, and I will be closed in 30 minutes.

In an implementation, after the closing the first task, the method further includes: collecting times of N historical records for initiating the first request message within a preset time period, wherein N is a positive integer greater than 1; acquiring third time information related to a sleep intention according to the collected times, wherein the third time information includes time point information or time period information; and updating the restricted time period according to third time point information.

According to embodiments of the present application, it is possible to attempt to guide a bedtime scene. In other words, a sleep intention may be pre-identified, and a restricted time period may be updated. For example, before receiving a sleep request issued by a user, a sleep intention may be identified according to a historical interaction within a certain time period. Specifically, a sleeping alarm set by a user is at 22:00. However, the user issued sleep requests at around 21:00 in the recent time period. Then, a pre-alert interaction may be set at a time before or after 21:00 (5-10 minutes), so as to improve user experience.

In an implementation, the method further includes: generating a second request message for asking whether to enter a sleeping related mode, according to the third time point information, and sending the second request message; receiving a second response message, wherein an affirmative answer to enter the sleeping related mode is encapsulated into the second response message; and closing a third task in the multiple interaction tasks to be executed according to the updated restricted time period.

In an example, an attempt is made to enter into a sleep scene. For example, a user may say "shut down", then a smart speaker may feedback "okay, <in order not to disturb your sleeping, all routine tasks before 5 o'clock tomorrow morning are closed for you>, and <a bedtime white noise/story/emotional radio/audio book> is selected for you to help you relax, would you like to try?" The user may continue to say "okay". Then, the smart speaker may continue to feedback "Got it, a white noise will be played for you for 15 minutes, is that okay? Have a good dream." If the smart speaker receives then an affirmative answer from the user, it may further feedback, such as "great, I will 'shutdown' after 15 minutes", or "please say 'shutdown' to me after 20:00 at night next time". In this case, user's feedback may be collected to subsequently optimize the interaction strategy. For example, the user may be guided into an operation of a sleep scene according to embodiments of the present application. If the smart speaker receives then a negative response from the user, it may still collect the current feedback and use it as a reference for subsequent optimization of the interaction strategy.

According to embodiments of the present application, an interaction strategy may be optimized. After receiving a first request message for a sleeping request, a user's sleep intention may be actively learned and comprehended, thereby correspondingly closing a target task within a restricted time period relating to the sleeping request. On the one hand, a disturbance to a user may be avoided through the active learning. On the other hand, with the active learning, there is no need for a user to set a certain function or forcibly close a related function (as long as a user operation is introduced, the number of interactions increases, which will not only result in a poor user experience and inefficiency, but also result in a reduced user satisfaction with the product), thereby reducing the number of interactions and improving the interaction efficiency.

Figure 5:
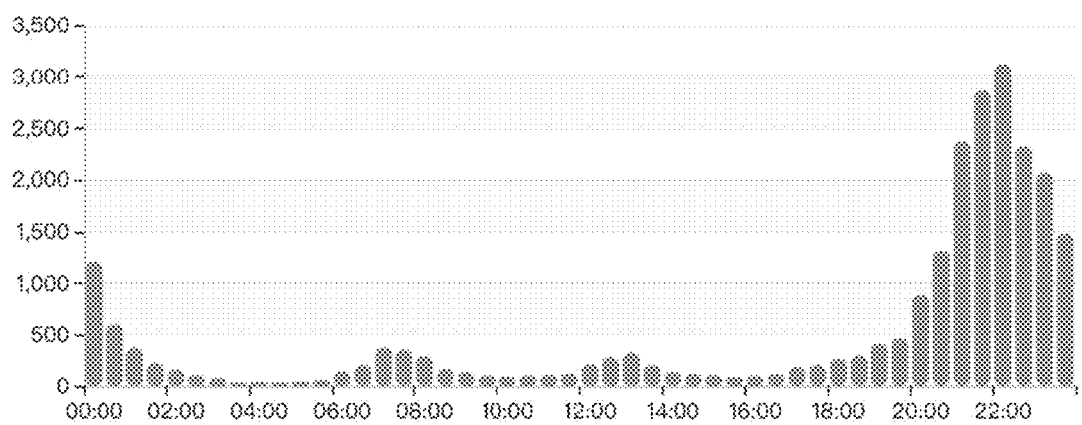
FIG. 5 is a schematic diagram showing a time period presenting a night sleeping trend according to an embodiment of the present application.
Figure 6:
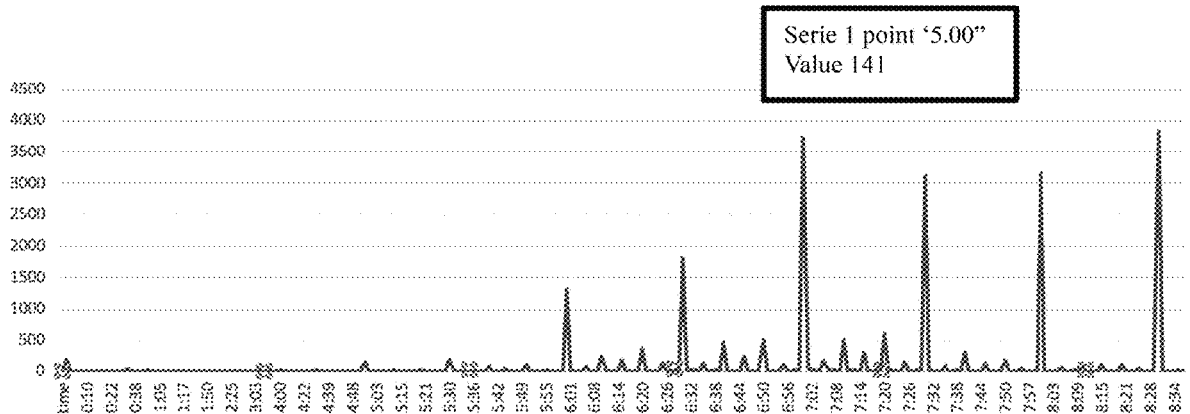
FIG. 6 is a schematic diagram showing a time period presenting a clock calling trend according to an embodiment of the present application.

FIG. 5 is a schematic diagram showing a time period presenting a night sleeping trend according to an embodiment of the present application. The time distribution trend of a sleeping request "good night, I have to sleep" issued by a user may be seen from FIG. 5. It may be seen that after 20:00, the trend that a user issued a sleeping request "good night" increases significantly. FIG. 6 is a schematic diagram showing a time period presenting a clock calling trend according to an embodiment of the present application. As shown in FIG. 6, there is a small peak at 5 am in the distribution of routines set by the user, and the subscription at the value of "141" is estimated to be used by the user as an alarm clock. Considering these two trends, a restricted time period may be set to 20:00 pm-01:30 am. That is to say, after timed routine tasks are set, when a user issues a sleeping request within the restriction time period, the set timed tasks within the restriction time period, such as 20:00 pm-01:30 am, are not executed.

An application example is described below.

Figure 7:
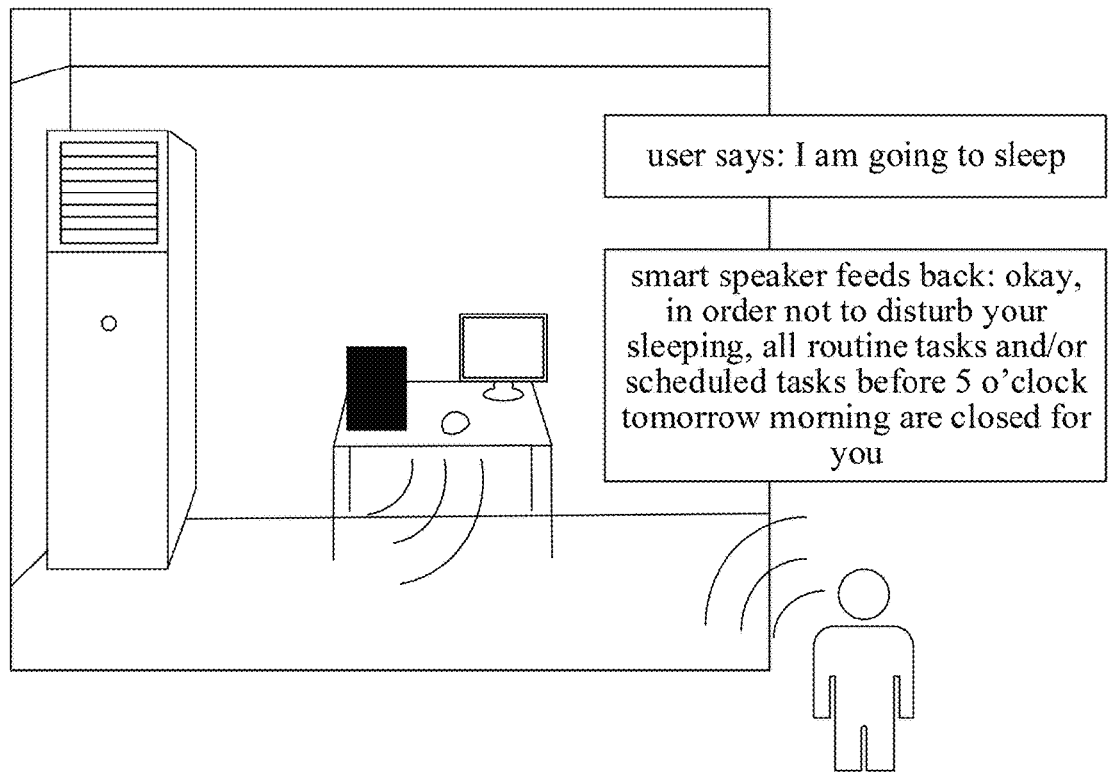
FIG. 7 is a schematic diagram showing an interaction scenario according to an embodiment of the present application.

FIG. 7 is a schematic diagram showing an interaction scenario according to an embodiment of the present application. As shown in FIG. 7, taking a smart speaker as an example, after a sleeping request "good night" is issued by a user, the smart speaker may receive a request message for the sleeping request, such as "I am going to sleep", and then a query instruction may be generated according to time information carried in the request message. For example, a sleep request is initiated at 20:30, based on the first time information, it may be determined that a timed task after 20:30 is required to be closed. Therefore, a corresponding query instruction is generated, to obtain a corresponding timed task. The smart speaker may respond to the query instruction. According to first time information and a query requirement carried in the query instruction, for example, a sleeping request is initiated at 20:30, based on the first time information, it may be determined that a timed task after 20:30 is required to be closed. A restricted time period corresponding to the time is acquired, to obtain a corresponding timed task. The timed task may be a task preset by the user before a sleeping request is received. The timed task may include a routine task and/or a scheduled task of a target user (such as a scheduled task of a child), for example, a task of listening to English or reading a book at 21:00. After the smart speaker queries the restricted time period "20:30 pm to 5 am" corresponding to the time information, timed tasks within the restricted time period, such as the task of listening to English or reading a book at 21:00, may be closed. Then, the smart speaker may feedback a reminder message that the timed task has been closed to the user. For example, the smart speaker may provide a feedback "okay, in order not to disturb your sleeping, all routine tasks/scheduled tasks before 5 o'clock tomorrow morning are closed for you" to the user.

Figure 8:
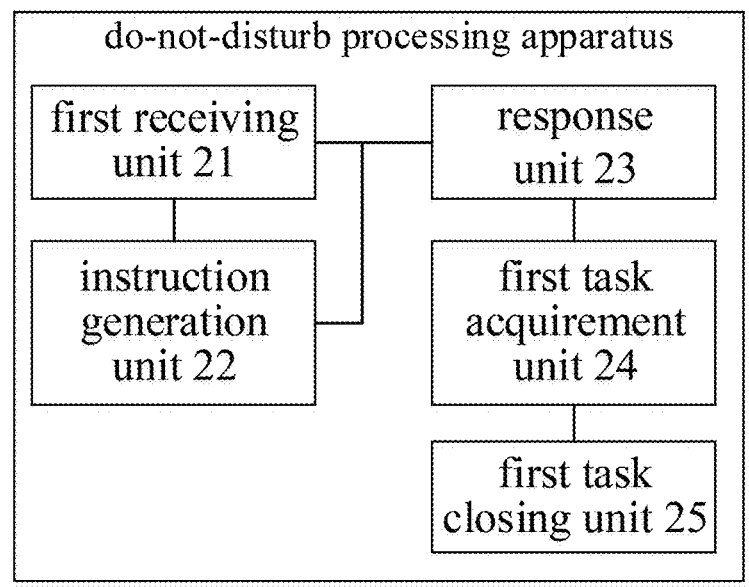
FIG. 8 is a structural block diagram showing a DND processing apparatus according to an embodiment of the present application.

FIG. 8 is a structural block diagram showing an DND processing apparatus according to an embodiment of the present application. The apparatus includes: a first receiving unit 21, configured to receive a first request message for a sleeping request; an instruction generation unit 22, configured to generate a query instruction according to first time information carried in the first request message; a response unit 23, configured to determine a restricted time period based on the first time information, in response to the query instruction; a first task acquiring unit 24, configured to acquire at least one first task within the restricted time period, from multiple interaction tasks to be executed; and a first task closing unit 25, configured to close the first task. The apparatus may be on a smart device side, or on a cloud platform side.

In an implementation, the apparatus further includes a configuration unit for configuring the multiple interaction tasks to be executed, according to historical data of a target user, wherein the multiple interaction tasks to be executed include a routine task and/or a scheduled task of the target user.

In an implementation, the response unit is further configured to: query the first time information from night time period information, by using the first time information as a query index; set the queried first time information as an initial time identifier of the restricted time period; set end time information of the night time period information as an end time identifier of the restricted time period; and determine the restricted time period according to the initial time identifier and the end time identifier.

In an implementation, the apparatus further includes: a monitoring unit configured to monitor system time of a terminal; a second task acquiring unit configured to acquire a second task related to second time information from the multiple interaction tasks to be executed, in a case where the system time reaches to a time corresponding to the second time information and the time corresponding to the second time information is not within the restricted time period; and a task execution unit configured to execute the second task.

In an implementation, the apparatus further includes: an encapsulation unit configured to obtain a message encapsulation format and at least two elements constituting a message content, wherein the at least two elements including a time field and a reminder field for indicating that the first task has been closed; a message generation unit configured to generate a first response message according to the message encapsulation format and the message content; and a first message sending unit configured to send the first response message.

In an implementation, the apparatus further includes: a collecting unit configured to collect times of N historical records for initiating the first request message within a preset time period, wherein N is a positive integer greater than 1; a sleeping intention acquiring unit configured to acquire third time information related to a sleep intention according to the collected times, wherein the third time information includes time point information or time period information; and an updating unit configured to update the restricted time period according to third time point information.

In an implementation, the apparatus further includes: a second message sending unit configured to generate a second request message for asking whether to enter a sleeping related mode, according to the third time point information, and send the second request message; a second message receiving unit configured to receive a second response message, wherein an affirmative answer to enter the sleeping related mode is encapsulated into the second response message; and a second task closing unit configured to close a third task in the multiple interaction tasks to be executed according to the updated restricted time period.

In this embodiment, functions of modules in the apparatus refer to the corresponding description of the method mentioned above and thus a detailed description thereof is omitted herein.

Figure 9:
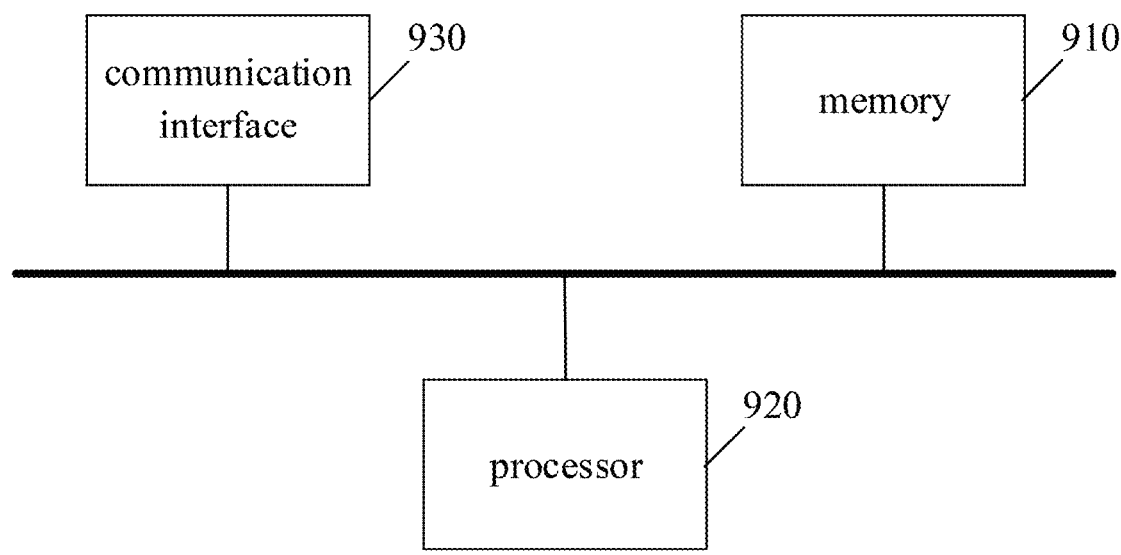
FIG. 9 is a structural block diagram showing a DND processing apparatus according to an embodiment of the present application.

FIG. 9 is a structural block diagram showing a DND processing apparatus according to an embodiment of the present application. The apparatus includes a memory 910 and a processor 920, wherein a computer program that can run on the processor 920 is stored in the memory 910. The processor 920 executes the computer program to implement the DND processing method according to foregoing embodiments. The number of either the memory 910 or the processor 920 may be one or more.

The apparatus may further include a communication interface 930 configured to communicate with an external device and exchange data.

The memory 910 may include a high-speed RAM memory and may also include a non-volatile memory, such as at least one magnetic disk memory.

If the memory 910, the processor 920, and the communication interface 930 are implemented independently, the memory 910, the processor 920, and the communication interface 930 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 9 to represent the bus, but it does not mean that there is only one bus or one type of bus.

Optionally, in a specific implementation, if the memory 910, the processor 920, and the communication interface 930 are integrated on one chip, the memory 910, the processor 920, and the communication interface 930 may implement mutual communication through an internal interface.

According to an embodiment of the present application, a computer-readable storage medium is provided for storing computer programs. When executed by a processor, the programs implement the method according to above embodiments.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A do-not-disturb processing method, implemented by circuits for implementing functions, comprising:
    receiving, by a smart device or a cloud platform, a first request message for a sleeping request; wherein the first request message is a voice request message, for wanting to sleep, sent by a target user;
    generating, by the smart device or the cloud platform, a query instruction according to first time information carried in the first request message; wherein the first time information is a time of initiating the sleeping request;
    determining, by the smart device or the cloud platform, a restricted time period based on the first time information, in response to the query instruction;
    acquiring, by the smart device or the cloud platform, at least one first task within the restricted time period, from multiple interaction tasks to be executed; and
    closing, by the smart device or the cloud platform, the first task;
    wherein the determining the restricted time period based on the first time information, in response to the query instruction, comprises:
    querying, by the smart device or the cloud platform, the first time information from night time period information, by using the first time information as a query index;
    setting, by the smart device or the cloud platform, the queried first time information as an initial time identifier of the restricted time period;
    setting, by the smart device or the cloud platform, end time information of the night time period information as an end time identifier of the restricted time period; and
    determining, by the smart device or the cloud platform, the restricted time period according to the initial time identifier and the end time identifier;
    wherein after the closing the first task, the method further comprises:
    collecting, by the smart device or the cloud platform, times of N historical records for initiating the first request message within a preset time period, wherein N is a positive integer greater than 1;
    acquiring, by the smart device or the cloud platform, third time information related to a sleep intention according to the collected times, wherein the third time information comprises time point information or time period information; and
    updating, by the smart device or the cloud platform, the restricted time period according to third time point information.

2. The do-not-disturb processing method according to claim 1, wherein before the receiving the first request message for the sleeping request, the method further comprises:
    configuring the multiple interaction tasks to be executed, according to historical data of the target user, wherein the multiple interaction tasks to be executed comprise a routine task and/or a scheduled task of the target user.

3. The do-not-disturb processing method according to claim 1, wherein after the closing the first task, the method further comprises:
    monitoring system time of a terminal;
    acquiring a second task related to second time information from the multiple interaction tasks to be executed, in a case where the system time reaches to a time corresponding to the second time information and the time corresponding to the second time information is not within the restricted time period; and
    executing the second task.

4. The do-not-disturb processing method according to claim 1, wherein after the closing the first task, the method further comprises:
    obtaining a message encapsulation format and at least two elements constituting a message content, wherein the at least two elements comprising a time field and a reminder field for indicating that the first task has been closed;
    generating a first response message according to the message encapsulation format and the message content; and
    sending the first response message.

5. The do-not-disturb processing method according to claim 1, wherein the method further comprises:
    generating a second request message for asking whether to enter a sleeping related mode, according to the third time point information, and sending the second request message;
    receiving a second response message, wherein an affirmative answer to enter the sleeping related mode is encapsulated into the second response message; and
    closing a third task in the multiple interaction tasks to be executed according to the updated restricted time period.

6. A do-not-disturb processing apparatus, comprising:
    one or more processors; and
    a memory for storing one or more programs, wherein the one or more programs are executed by the one or more processors to enable the one or more processors, by circuits for implementing functions, to:
    receive, by a smart device or a cloud platform, a first request message for a sleeping request; wherein the first request message is a voice request message, for wanting to sleep, sent by a target user;
    generate, by the smart device or the cloud platform, a query instruction according to first time information carried in the first request message; wherein the first time information is a time of initiating the sleeping request;

determine, by the smart device or the cloud platform, a restricted time period based on the first time information, in response to the query instruction;

acquire, by the smart device or the cloud platform, at least one first task within the restricted time period, from multiple interaction tasks to be executed; and close, by the smart device or the cloud platform, the first task;

wherein the one or more programs are executed by the one or more processors to enable the one or more processors to:

query, by the smart device or the cloud platform, the first time information from night time period information, by using the first time information as a query index;

set, by the smart device or the cloud platform, the queried first time information as an initial time identifier of the restricted time period;

set, by the smart device or the cloud platform, end time information of the night time period information as an end time identifier of the restricted time period; and determine, by the smart device or the cloud platform, the restricted time period according to the initial time identifier and the end time identifier;

wherein the one or more programs are executed by the one or more processors to enable the one or more processors to:

collect, by the smart device or the cloud platform, times of N historical records for initiating the first request message within a preset time period, wherein N is a positive integer greater than 1;

acquire, by the smart device or the cloud platform, third time information related to a sleep intention according to the collected times, wherein the third time information comprises time point information or time period information; and update, by the smart device or the cloud platform, the restricted time period according to third time point information.

7. The do-not-disturb processing apparatus according to claim 6, wherein the one or more programs are executed by the one or more processors to enable the one or more processors to:

configure the multiple interaction tasks to be executed, according to historical data of the target user, wherein the multiple interaction tasks to be executed comprise a routine task and/or a scheduled task of the target user.

8. The do-not-disturb processing apparatus according to claim 6, wherein the one or more programs are executed by the one or more processors to enable the one or more processors to:

monitor system time of a terminal;

acquire a second task related to second time information from the multiple interaction tasks to be executed, in a case where the system time reaches to a time corresponding to the second time information and the time corresponding to the second time information is not within the restricted time period; and execute the second task.

9. The do-not-disturb processing apparatus according to claim 6, wherein the one or more programs are executed by the one or more processors to enable the one or more processors to:

obtain a message encapsulation format and at least two elements constituting a message content, wherein the at least two elements comprising a time field and a reminder field for indicating that the first task has been closed;

generate a first response message according to the message encapsulation format and the message content; and send the first response message.

10. The do-not-disturb processing apparatus according to claim 6, wherein the one or more programs are executed by the one or more processors to enable the one or more processors to:

generate a second request message for asking whether to enter a sleeping related mode, according to the third time point information, and send the second request message;

receive a second response message, wherein an affirmative answer to enter the sleeping related mode is encapsulated into the second response message; and close a third task in the multiple interaction tasks to be executed according to the updated restricted time period.

11. A non-transitory computer-readable storage medium, in which a computer program is stored, wherein the computer program, when executed by a processor, causes the processor to perform, by circuits for implementing functions, operations of:

receiving, by a smart device or a cloud platform, a first request message for a sleeping request; wherein the first request message is a voice request message, for wanting to sleep, sent by a target user;

generating, by the smart device or the cloud platform, a query instruction according to first time information carried in the first request message; wherein the first time information is a time of initiating the sleeping request;

determining, by the smart device or the cloud platform, a restricted time period based on the first time information, in response to the query instruction;

acquiring, by the smart device or the cloud platform, at least one first task within the restricted time period, from multiple interaction tasks to be executed; and closing, by the smart device or the cloud platform, the first task;

wherein when the computer program, when executed by the processor, causes the processor to determine the restricted time period based on the first time information, in response to the query instruction, the computer program, when executed by the processor, causes the processor specifically to perform operations of:

querying, by the smart device or the cloud platform, the first time information from night time period information, by using the first time information as a query index;

setting, by the smart device or the cloud platform, the queried first time information as an initial time identifier of the restricted time period;

setting, by the smart device or the cloud platform, end time information of the night time period information as an end time identifier of the restricted time period; and determining, by the smart device or the cloud platform, the restricted time period according to the initial time identifier and the end time identifier;

wherein the computer program, when executed by the processor, causes the processor to further perform operations of:

collecting, by the smart device or the cloud platform, times of N historical records for initiating the first request message within a preset time period, wherein N is a positive integer greater than 1;

acquiring, by the smart device or the cloud platform, third time information related to a sleep intention according to the collected times, wherein the third time information comprises time point information or time period information; and updating, by the smart device or the cloud platform, the restricted time period according to third time point information.

* * * * *